United States Patent
Abulkhair et al.

(10) Patent No.: US 11,572,291 B2
(45) Date of Patent: *Feb. 7, 2023

(54) MEMBRANE FILTER APPARATUS FOR LIQUID MIXTURES

(71) Applicant: King Abdulaziz University, Jeddah (SA)

(72) Inventors: Hani Abdullah Abulkhair, Jeddah (SA); Iqbal Ahmed Moujdin, Jeddah (SA); Mohammad S. Albeiruti, Jeddah (SA); Amer Ahmed Jamil Shaiban, Jeddah (SA)

(73) Assignee: King Abdulaziz University, Jeddah (SA)

( * ) Notice: Subject to any disclaimer, the term of this patent is extended or adjusted under 35 U.S.C. 154(b) by 137 days.

This patent is subject to a terminal disclaimer.

(21) Appl. No.: 17/177,804

(22) Filed: Feb. 17, 2021

(65) Prior Publication Data
US 2022/0259080 A1   Aug. 18, 2022

(51) Int. Cl.
*C02F 1/44* (2006.01)

(52) U.S. Cl.
CPC .......... *C02F 1/444* (2013.01); *C02F 2301/04* (2013.01); *C02F 2303/16* (2013.01)

(58) Field of Classification Search
None
See application file for complete search history.

(56) References Cited

U.S. PATENT DOCUMENTS

| 5,779,269 | A | 7/1998 | Moore et al. |
| 11,111,159 | B1 * | 9/2021 | Abulkhair ............... C02F 1/444 |
| 2004/0203140 | A1 * | 10/2004 | Akers .................... C12M 23/14 |
| | | | 435/297.2 |
| 2006/0273003 | A1 | 12/2006 | Sudo et al. |
| 2008/0257824 | A1 * | 10/2008 | Campanile ........... B01D 61/147 |
| | | | 210/108 |

FOREIGN PATENT DOCUMENTS

| WO | 2019/025969 A1 | 2/2019 |
| WO | 2019/191540 A9 | 10/2019 |
| WO | 2019/191613 A1 | 10/2019 |

* cited by examiner

*Primary Examiner* — Richard C Gurtowski
(74) *Attorney, Agent, or Firm* — Oblon, McClelland, Maier & Neustadt, L.L.P.

(57) ABSTRACT

A membrane filter apparatus for splitting a feed into filtrate and retentate is provided. The apparatus comprises a body chamber, a feed inlet disposed on the body chamber, a retentate outlet located in the body chamber, a feed distribution tube connected to the feed inlet, and a filter assembly having a filter. The feed distribution tube has a length sufficient to cause the feed to enter the body chamber at a feed distance from the filter assembly of no greater than 50% of a total length of the body chamber. The feed flows across the filter in a direction parallel to a surface of the filter assembly. The filtrate passes through the filter assembly and the retentate flows through the body chamber in a direction antiparallel to the feed flow through the feed distribution tube and out through the retentate outlet.

18 Claims, 8 Drawing Sheets

MEMBRANE FILTER APPARATUS FOR LIQUID MIXTURES

BACKGROUND OF THE INVENTION

Field of the Invention

The present disclosure relates to a filtration apparatus which uses a membrane filter configured for use with a liquid mixture and a method of filtering the liquid mixture.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Membrane filters are generally used to separate impurities from fluids in applications such as water purification, beverage processing, wastewater treatment, and other applications which require separation of unwanted particles or impurities from the fluid. This is usually done by interposing a medium such as a semi-permeable or permeable membrane. The membrane typically comprises pores of desired size and thereby acts as a filter element to remove the impurities or unwanted particles from the fluid. In the known setup of a typical membrane system, a pump forces the contaminated fluid towards the membrane. Some amount of fluid permeates the membrane as a product fluid with almost zero contamination whereas the remaining fluid leaves as a fluid with impurities.

In general, there are two common membrane filtration systems or filtration geometries: dead-end filtration and a cross-flow filtration. In the dead-end filtration system, the fluid to be filtered is fed perpendicular to the filter element and all fluid passes through the filter element with retained solids forming a cake layer of impurities on the surface of the filter element. On the other hand, the cross-flow filtration system, also known as a tangential flow filtration, is a type of filtration in which the majority of the feed flow travels tangentially across the surface of the filter element. Dialysis may be thought of as a sub-type of cross-flow filtration or as a separate filtration geometry. In dialysis, the feed is provided as distinct aliquots and is not provided as a flow, though the filtrate may flow. These different filtration geometries provide distinct advantages and disadvantages and therefore are typically used in various, but different applications.

Both types of filtration system usually contain a feed chamber where the external feed fluid enters and proceeds towards a membrane for filtration. However, it is observed that the fluid flow through the membrane of the existing filtration devices has an uneven feed fluid velocity and pressure in the feed chamber. This uneven feed fluid velocity and pressure causes the fluid to pass through only at some specific points of the membrane or causes different flow patterns through the membrane. Different flow pattern in the membrane can result in an inaccurate prediction of the product fluxes and thus poor filtration performance. The uneven feed fluid velocity and pressure may be controlled or eliminated by using an external hydraulic pumps or pneumatic clamping device within the feed chamber in some known filtration system, however they are relatively expensive. Also, existing filtration systems are quite big in size and the components of the systems are not easily assembled and disengaged or may require lot of physical efforts. Moreover, existing systems are designed to operate in a single filtration geometry. The various filtration geometries such as cross-flow filtration, dead-end filtration, and dialysis processes must be performed on separate dedicated devices.

Hence, there remains a need for an efficient filtration system which can overcome the aforementioned shortcomings or problems of the existing filtration system. Also, there is need for a membrane filter device which is compact in size, easy to handle and portable, components can be assembled and disengaged easily without involving much physical efforts or specialized equipment and a filtration system capable of performing filtration in the cross filtration, dead-end filtration, hybrid, and even a dialysis arrangements.

SUMMARY OF THE INVENTION

The present disclosure relates to a membrane filter apparatus. The membrane filter apparatus comprises a body chamber comprising an inlet end and a filter end. A feed inlet is disposed on the inlet end of the body chamber. A feed distribution tube is fluidly connected to the feed inlet and comprises a distribution inlet end and a distribution outlet end. The feed distribution tube further comprises one or more feed outlet openings through which a feed may pass into the body chamber. A retentate outlet is fluidly connected to the body chamber and located at the inlet end of the body chamber. The membrane filter apparatus further comprises a filter assembly comprising a filter located at the filter end of the body chamber and oriented substantially perpendicular to the feed distribution tube. The filter assembly further comprises a filter support in contact with a portion of the filter. A filter cap interfaces with the filter end of the body chamber and secures the filter assembly to the filter end of the body chamber. The feed distribution tube passes through a center of the body chamber in a direction substantially parallel to a length of the body chamber has a feed distribution tube length sufficient to cause the feed to enter the body chamber at a feed start point such that a feed distance measured from the filter assembly to the feed start point that is less than an entrance distance measured from the feed start point to the feed inlet. The membrane filter apparatus is configured such that a feed may flow into the feed inlet, through the feed distribution tube, and out through the one or more feed outlet openings such that the feed flows across the filter in a direction substantially parallel to a surface of the filter assembly. In which the filter is configured to split the feed into a filtrate and a retentate. The filtrate passes through the filter assembly and the retentate flows through the body chamber in a direction substantially antiparallel to the feed liquid flowing through the feed distribution tube and out through the retentate outlet.

In some embodiments, the body chamber is substantially cylindrical in shape.

In some embodiments, the feed liquid flows through the one or more feed outlet openings such that a feed liquid flow distribution across the filter assembly is substantially evenly distributed across the surface of the filter assembly.

In some embodiments, the membrane filter apparatus comprises a filtrate chamber attached to the filter cap at a location opposite the body chamber.

In some embodiments, the membrane filter apparatus comprises a filtrate outlet fluidly connected to the filtrate chamber.

In some embodiments, the filter end of the body chamber and the filter cap comprise threading which is configured to interlock to interface and secure the filter cap to the body chamber.

In some embodiments, the body chamber and the filter cap comprise a grip flange attached to or disposed upon an exterior surface of the filter cap or the filter chamber.

In some embodiments, the grip flange has a substantially hexagonal shape.

In some embodiments, the membrane filter apparatus comprises a filter assembly gasket located between the body chamber and the filter assembly.

In some embodiments, the filter support comprises a non-flexible support plate located between the filter and the filter cap.

In some embodiments, the non-flexible support plate is macroporous.

In some embodiments, the filter assembly comprises a filter support gasket located between the filter and the non-flexible support plate.

In some embodiments, the membrane filter apparatus comprises a body cap attached to or disposed upon the inlet end of the body chamber.

In some embodiments, the body cap and the inlet end of the body chamber comprise threading which is configured to interlock to interface and secure the body cap to the body chamber.

In some embodiments, the filter comprises a polymer membrane.

In some embodiments, the polymer membrane is mesoporous or microporous.

In some embodiments, the polymer membrane comprises at least one polymer selected from the group consisting of celluloses, polysulfones, polynitriles, polyamides, polyimides, polyolefins, fluoropolymers, and chloropolymers.

The present disclosure also relates to a method of filtering a liquid mixture. The method comprises providing to the feed inlet of the membrane filter apparatus the liquid mixture, recovering from the retentate outlet a retentate, and collecting from the filter cap a filtrate.

In some embodiments, the liquid mixture is an aqueous mixture.

BRIEF DESCRIPTION OF THE DRAWINGS

A better understanding of embodiments of the present disclosure (including alternatives and/or variations thereof) may be obtained with reference to the detailed description of the embodiments along with the following drawings, in which:

FIG. 6 is a perspective view of a body chamber, according to an embodiment of the present disclosure and shown side-on;

DETAILED DESCRIPTION OF THE INVENTION

Figure 1:
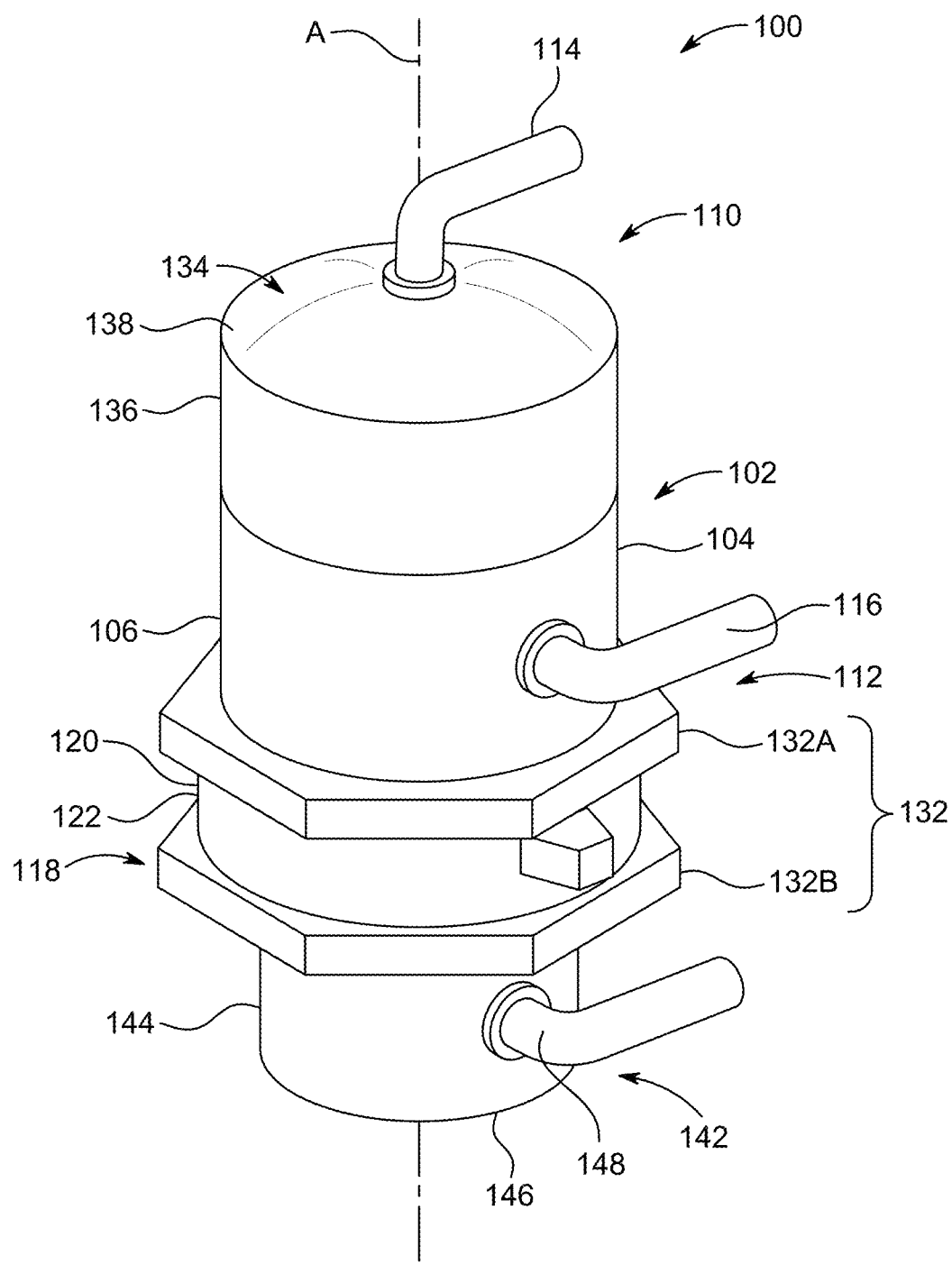
FIG. 1 is a perspective view of a membrane filter apparatus, according to an embodiment of the present disclosure.

In the following description, it is understood that other embodiments may be utilized, and structural and operational changes may be made without departure from the scope of the present embodiments disclosed herein.

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the term "liquid mixture" refers to a mixture comprising at least one liquid, the mixture retaining the ability to flow. The properties or characteristics of the liquid mixture or the flow thereof may be altered from the liquid or liquids of which it is comprised. Examples of such properties or characteristics are density, vapor pressure, hydrostatic pressure, surface tension, and viscosity.

According to a first aspect, the present disclosure relates to a membrane filter apparatus for splitting a feed into a filtrate and a retentate. The membrane filter apparatus comprises a body chamber, a feed inlet disposed on the body chamber, a feed distribution tube fluidly connected to the feed inlet, a retentate outlet fluidly connected to the body chamber, and a filter assembly having a filter and a filter support in contact with the filter. The feed distribution tube has a length sufficient to cause the feed to enter the body chamber at a feed distance from the filter assembly of no greater than 50% of a total length of the body chamber. In some embodiments, the feed distribution tube has a length sufficient to cause the feed to enter the body chamber at a feed distance from the filter assembly of no greater than 52.5%, preferably 55%, preferably 57.5%, preferably 60%, preferably 62.5%, preferably 65%, preferably 67.5%, preferably 70%, preferably 72.5%, preferably 75%, preferably 77.5%, preferably 80% of a total length of the body chamber. The feed exits the feed distribution tube through one or more feed outlet openings of the feed distribution tube. The feed then flows across the filter in a direction substantially parallel to a surface of the filter assembly. The filter assembly is configured to filter the flow such that a filtrate passes through the filter assembly and a retentate does not pass through the filter assembly and instead flows through the body chamber in a direction substantially antiparallel to the feed flowing through the feed distribution tube and out through the retentate outlet.

Referring to FIG. 1, a perspective view of a membrane filter apparatus 100 is illustrated, according to an embodiment of the present disclosure. The membrane filter apparatus 100 is configured to filter a liquid mixture. In some embodiments, the liquid mixture is a contaminated liquid and the membrane filter apparatus 100 may be used to purify the contaminated liquid during a filtration process. In some embodiments, the liquid mixture comprises a first component and at least one secondary component. In some embodiments, the first component is a liquid. In general, the secondary components may be liquids, dissolved materials, and/or undissolved materials. Examples of dissolved materials and undissolved materials include salts, proteins, ions, charged or uncharged molecules, polymers, minerals, and microbes. The secondary components may also be referred to impurities, contaminants, particulates, and unwanted components. In some embodiments, the liquid mixture is an aqueous mixture.

Figure 6:
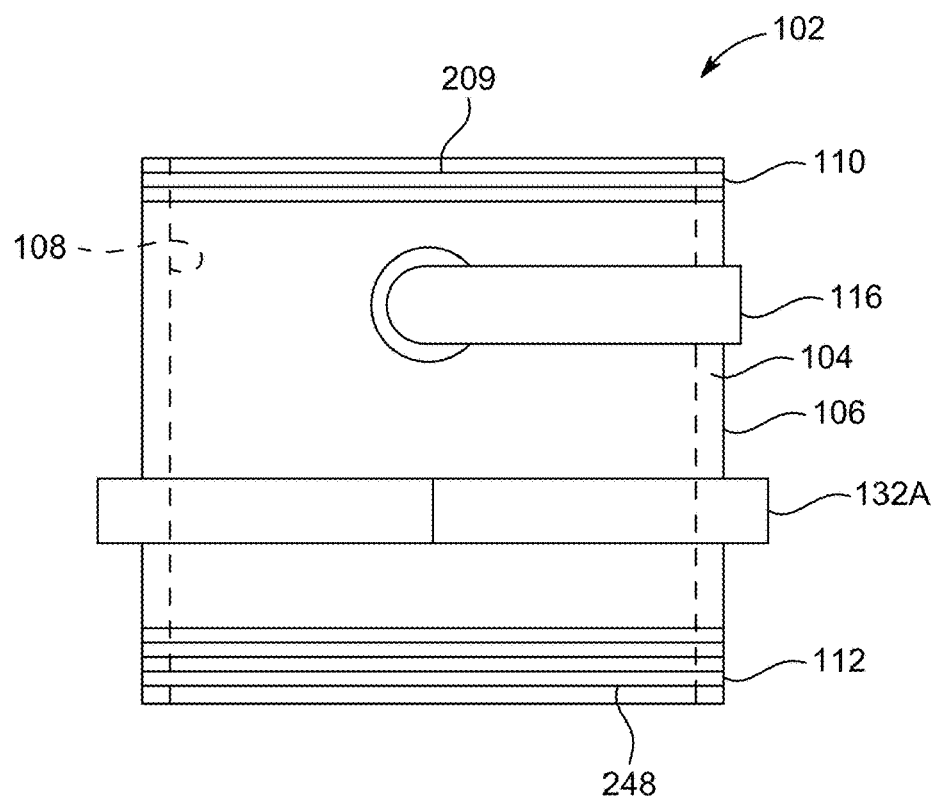
Figure 7:
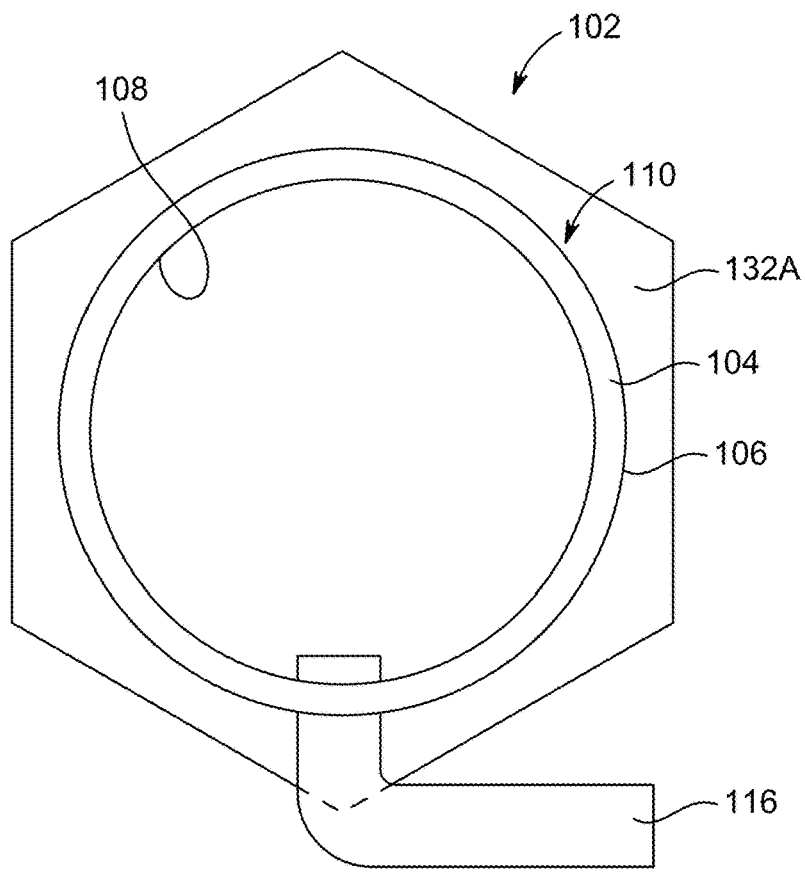
FIG. 7 is a perspective view of a body chamber, according to an embodiment of the present disclosure and shown top-down.

The membrane filter apparatus 100 comprises a body chamber 102. Images of an exemplary body chamber 102 according to an embodiment of the current invention is provided in FIGS. 6 and 7. In some embodiments, the body chamber 102 is substantially cylindrical in shape. In such embodiments, the body chamber 102 may be a hollow cylindrical body having a wall 104 defining an exterior surface 106 and an interior surface 108 (shown in FIG. 2). The body chamber 102 comprises an inlet end 110 and a filter end 112. The inlet end 110 may be otherwise referred to as the upper end of the body chamber 102 and the filter end 112 may be otherwise referred to as the lower end of the body chamber 102. The membrane filter apparatus 100 further comprises a feed inlet 114 for inflow of the liquid mixture into the body chamber 102. An image of an exemplary feed inlet 114 according to an embodiment of the current invention is provided in FIG. 3. The feed inlet 114 is disposed at the inlet end 110 of the body chamber 102. In some embodiments, the feed inlet 114 is in the form of a conduit disposed at the inlet end 110 of the body chamber 102 to allow flow of the liquid mixture into the body chamber 102. In some embodiments, the feed inlet 114 further comprises a feed inlet valve (not shown) for restricting, allowing, or controlling flow of the liquid mixture into the body chamber 102.

The membrane filter apparatus 100 further comprises a retentate outlet 116 fluidly connected to the body chamber 102 for outflow of a retentate during the filtration process. The retentate outlet 116 is located at the inlet end 110 of the body chamber 102. In some embodiments, the retentate outlet 116 is located at the inlet end 110 of the body chamber 102 at a location proximal to the filter end 112 of the body chamber 102. In some embodiments, the retentate outlet 116 is in the form of a conduit located at the inlet end 110 of the body chamber 102 to exit the retentate from the body chamber 102. In some embodiments, one end of the retentate outlet 116 is fluidly connected to the wall 104 of the body chamber 102. In some embodiments, a second end of the retentate outlet 116 is coupled to a retentate container. This retentate container may be used for receiving the retentate from the membrane filter apparatus 100. In some embodiments, the retentate outlet 116 further comprises a retentate outlet valve (not shown) for restricting, allowing, or controlling flow of the retentate therethrough during the filtration process.

The membrane filter apparatus 100 further comprises a filter cap 118 configured to interface with the filter end 112 of the body chamber 102. In some embodiments, the filter cap 118 is substantially cylindrical in shape. In such embodiments, the filter cap 118 is a hollow cylindrical body having a filter cap wall 120 defining an exterior surface 122 and an interior surface 124 (shown in FIG. 2 and FIG. 11). The filter cap 118 is coaxially connected to the body chamber 102 along a longitudinal axis 'A' of the membrane filter apparatus 100 and configured to secure a filter assembly 130 (shown in FIG. 2 and FIG. 11) of the membrane filter apparatus 100 to the filter end 112 of the body chamber 102.

In some embodiments, the body chamber 102 comprises one or more body chamber grip flanges 132A attached to or disposed the exterior surface 106 of the body chamber 102. In some embodiments, the filter cap 118 comprises one or more filter cap grip flanges 132B attached to or disposed on the exterior surface 122 of the filter cap. In some embodiments, a first grip flange 132A is attached to or disposed upon the exterior surface 106 of the body chamber 102 and a second grip flange 132B is attached to or disposed upon the exterior surface 122 of the filter cap 118. The first grip flange 132A and the second grip flange 132B are hereinafter individually referred to as the grip flange 132 and collectively referred to as the grip flanges 132 unless otherwise specifically mentioned. In some embodiments, the grip flange 132 has a substantially hexagonal shape. In some embodiments, the grip flange 132 may be a square shape, a polygon shape or any other shape known to one of ordinary skill in the art. The grip flanges 132 may help a user to firmly hold the body chamber 102 and the filter cap 118 during assembly or disassembly of the membrane filter apparatus 100.

In some embodiments, the grip flange 132 is configured in such a way to engage with or be engaged by fastening tools such as a wrench, a spanner, or any other fastening tools known to one of ordinary skill in the art. In some embodiments, the body chamber 102 includes the first grip flange 132A in the form of a hexagonal shape and the filter cap 118 includes a holding portion, in place of the second grip flange 132B, to prevent the filter cap 118 from rotation during assembly or disassembly of the membrane filter apparatus 100. In such embodiments, the filter cap 118 may be held stationary using the holding portion and the body chamber 102 may be moved relative to the filter cap 118 during assembly or disassembly of the membrane filter apparatus 100. Similarly, in some embodiments, the filter cap 118 includes the second grip flange 132B in the form of a hexagonal shape and the body chamber 102 includes a holding portion, in place of the first grip flange 132A, to prevent the body chamber 102 from rotation during assembly or disassembly of the membrane filter apparatus 100. In such embodiments, the body chamber 102 may be held stationary using the holding portion and the filter cap 118 may be moved relative to the body chamber 102 during assembly or disassembly of the membrane filter apparatus 100. In some embodiments, the holding portion is a protrusion extending from the exterior surfaces 106 or 122 of the body chamber 102 or the filter cap 118, respectively. In such embodiments, the protrusion is configured to engage with or be engaged by a fastening tool. In some embodiments, the holding portion is a notch defined on the exterior surfaces 106 or 122 of the body chamber 102 or the filter cap 118, respectively, configured to engage with or be engaged by the fastening tools.

Figure 4:
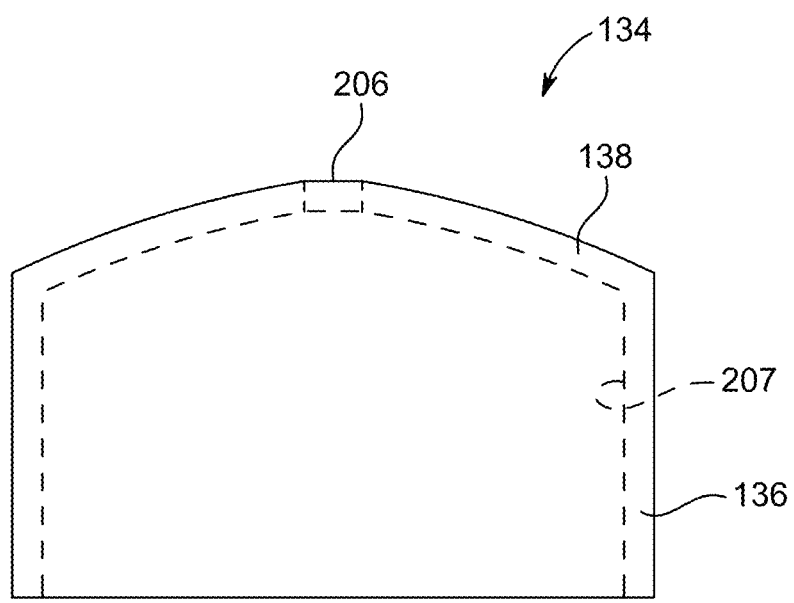
FIG. 4 is a perspective view of a body cap, according to an embodiment of the present disclosure.

The membrane filter apparatus 100 further comprises a body cap 134 attached to or disposed upon the inlet end 110 of the body chamber 102. An image of an exemplary body cap 134 according to an embodiment of the current invention is provided in FIG. 4. In some embodiments, the body cap 134 is substantially cylindrical in shape. In such embodiments, the body cap 134 may be a hollow cylindrical body comprising a side wall 136 and a top wall 138 closing a top end of the body cap 134. A bottom end of the of the body cap 134 is coaxially engaged with the inlet end 110 of the body chamber 102. As such, the body chamber 102 and the body cap 134 together define an interior volume 140 (shown in FIG. 11) to receive the liquid mixture, otherwise known as the feed, therein during the filtration process. The top wall 138 of the body cap 134 is configured to fluidly communicate the feed inlet 114 with the interior volume 140 of the membrane filter apparatus 100. In some embodiments, the body cap 134 is attached to the inlet end 110 of the body chamber 102 in such a way that the membrane filter apparatus may operate at ambient air pressure during the filtration process. In other words, a pressure-tight mechanical seal may not be achieved while connecting the body cap 134 with the inlet end 110 of the body chamber 102 such that the liquid mixture may be entered the body chamber 102 at the ambient air pressure. In some embodiments, the body cap 134 is attached to the inlet end 110 of the body chamber 102 in such a way that the membrane filter apparatus may operate at a desired pressure during the filtration process. In other words, a pressure-tight mechanical seal may be achieved while connecting the body cap 134 with the inlet end 110 of the body chamber 102. This seal may allow that the liquid mixture be provided to the body chamber 102 at a desired pressure greater than or less than ambient air pressure or the that the pressure within the interior volume 140 of the membrane filter apparatus 100 be maintained at an interior pressure greater or less than ambient air pressure.

In some embodiments, the membrane filter apparatus 100 further comprises a filtrate chamber 142 attached to the filter cap 118. In some embodiments, the filtrate chamber 142 is attached to, disposed upon, or integrated with the filter cap 118 at a location opposite the body chamber 102. The filtrate chamber 142 is configured to receive a filtrate passed through the filter assembly 130 during the filtration process. In some embodiments, the filtrate chamber 142 is substantially cylindrical in shape. In preferred embodiments, the filtrate chamber 142 has substantially the same shape or cross-sectional shape as the filter cap 118. In some embodiments, the filtrate chamber 142 is a hollow cylindrical body comprising a side wall 144 and a bottom wall 146 closing a bottom end of the filtrate chamber 142. A top end of the of the filtrate chamber 142 may be coaxially engaged with the filter cap 118. In some embodiments, the side wall 144 of the filtrate chamber 142 is configured to fluidly communicate with a filtrate outlet 148 of the membrane filter apparatus 100. In some embodiments, the filtrate outlet 148 may be located at a location proximal to the top end of the filtrate chamber 142. In some embodiments, the filtrate outlet 148 is located at a location proximal to the bottom end of the filtrate chamber 142. In some embodiments, the filtrate outlet 148 is located at the bottom wall 146 of the filtrate chamber 142. In some embodiments, the bottom wall 146 includes an additional port (not shown) apart from the filtrate outlet 148 provided in the side wall 144. In such embodiments, the filtrate outlet 148 and the additional port may be selectively opened or closed during a filtration process such as a dialysis process. In some embodiments, the filtrate outlet 148 is in the form of a conduit configured to exit the filtrate from the filtrate chamber 142 during the filtration process. In some embodiments, the filtrate outlet 148 additionally comprises a filtrate outlet valve (not shown) for restricting, allowing, or controlling flow of the filtrate therethrough during the filtration process.

Figure 2:
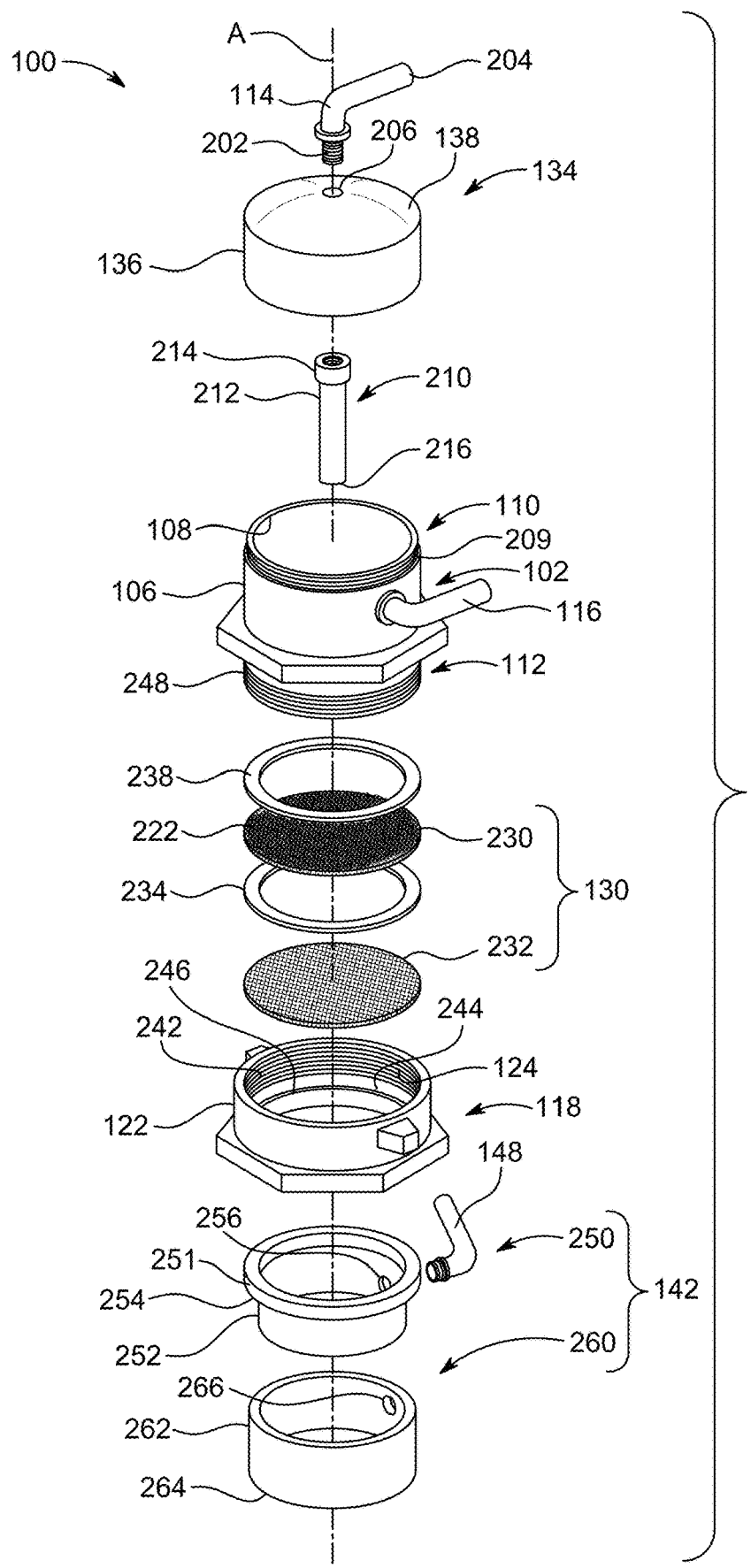
FIG. 2 is an exploded view of the membrane filter apparatus of FIG. 1, according to an embodiment of the present disclosure.
Figure 3:
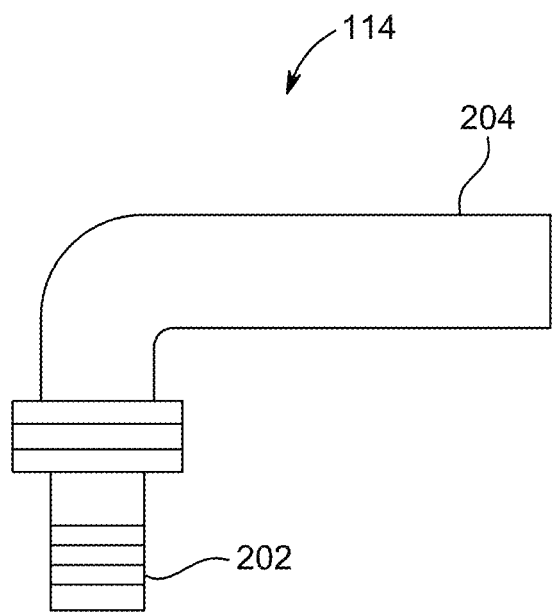
FIG. 3 is a perspective view of a feed inlet, according to an embodiment of the present disclosure.

Referring to FIG. 2, an exploded view of the membrane filter apparatus 100 is illustrated, according to an embodiment of the present disclosure. The membrane filter apparatus 100 comprises the feed inlet 114 having a first end 202 configured to attach with the top wall 138 of the body cap 134 and a second end 204 configured to fluidly couple with a liquid mixture source (not shown). The liquid mixture source may be a container used for storing the liquid mixture to be filtered. In some embodiments, the second end 204 of the feed inlet 114 may be coupled to the liquid mixture source using a hose, a pipe, a tube, or any other conduit known to one of ordinary skill in the art. In some embodiments, the feed inlet 114 is made of flexible material. In alternative embodiments, the feed inlet 114 is made of a non-flexible material. In some embodiments, the top wall 138 of the body cap 134 includes a through-hole 206 configured to receive and engage with the first end 202 of the feed inlet 114. In some embodiments, the side wall 136 includes a through-hole to receive and engage with the first end 202 of the feed inlet 114. In some embodiments, these through-holes do not engage with the feed inlet.

In some embodiments, the body cap 134 comprises a body cap threading 208 (shown in FIG. 11) configured to engage with body chamber threading 209 located on, attached to, or integrated with the body chamber 102. In some embodiments, the body cap threading is located on, attached to, or integrated with an inner surface 207 (shown in FIG. 11) of the side wall 136 of the body cap 134. In some embodiments, such body cap threading is configured to threadably engage with the body chamber threading 209. In such embodiments, the body chamber threading 209 is provided on the exterior surface 106 at the inlet end 110 of the body chamber 102. In some embodiments, during assembly of the membrane filter apparatus 100, the body cap threading 208 of the body cap 134 and the body chamber threading 209 of the body chamber 102 are configured to interlock to interface and secure the body cap 134 to the body chamber 102. In some embodiments, an outer surface of the side wall 136 of the body cap 134 may include a threading and a corresponding feed inlet threading may be provided on the interior surface 108 at the inlet end 110 of the body chamber 102. In some embodiments, the body cap 134 is secured to the body chamber 102 using an adhesive. In some embodiments, the body cap 134 is coupled to the body chamber 102 using a clamping mechanism, a press-fit mechanism, or any other coupling mechanisms known to one of ordinary skill in the art. In some embodiments, a body cap gasket is located between the body cap 132 and the body chamber 102 or otherwise disposed in the coupling therebetween. In such embodiments, the body cap gasket is pressure-tight.

Figure 5:
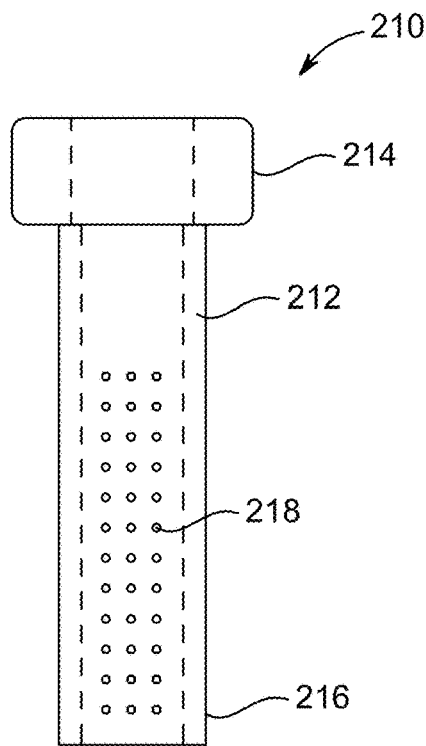
FIG. 5 is a perspective view of a feed distribution tube, according to an embodiment of the present disclosure.

The membrane filter apparatus 100 further comprises a feed distribution tube 210 fluidly connected to the feed inlet 114. The feed distribution tube 210 is configured such that the liquid mixture enters through the feed inlet 114 and proceeds towards the feed distribution tube 210 before passing to the filter assembly 130. An image of an exemplary feed distribution tube 210 according to an embodiment of the current invention is provided in FIG. 5. In some embodiments, the feed distribution tube 210 is a hollow cylindrical tube. In such embodiments, the distribution tube has a distribution tube wall 212 made of non-flexible material. In some embodiments, the feed distribution tube 210 comprises a distribution inlet end 214 and a distribution outlet end 216. The distribution inlet end 214 may be otherwise referred to as the top end of the feed distribution tube 210 configured to fluidly connect to the first end 202 of the feed inlet 114. In some embodiments, the distribution inlet end 214 of the feed distribution tube 210 and the first end 202 of the feed inlet 114 comprise threading for reversibly and fluidly connecting each other. In some embodiments, the first end 202 of the feed inlet 114 and the distribution inlet end 214 of the feed distribution tube 210 may be connected using a snap-fit mechanism, a press-fit mechanism, an adhesive, or any other fluid tight connection mechanism known to one of ordinary skill in the art. The distribution outlet end 216 may be otherwise referred to as the bottom end of the feed distribution tube 210. The distribution outlet end 216 comprises one or more feed outlet openings 218 (shown in FIG. 5 and FIG. 11) through which the feed may pass into the interior volume 140 of the membrane filter apparatus 100. In some embodiments, the feed outlet openings 218 are defined in the distribution tube wall 212 across a feed distribution length L' (shown in FIG. 11). The feed distribution length L' spans the distance from a feed start point, to a feed outlet opening closest to the filter assembly. The phrase 'feed start point' may be understood to refer to the distance along the feed tube at which the feed encounters a first feed outlet opening and thus may flow out of the distribution tube. Equivalently, the feed start point is the distance from the filter assembly to a farthest feed outlet opening. The feed outlet openings 218 may be present starting at the feed start point as defined above. The feed outlet opening closest to the filter assembly may be known as a "last feed outlet opening" and the feed outlet opening present at the feed start point may be known as a "first feed outlet opening". In some embodiments, the feed outlet openings 218 may be in the shape of a circle. In some embodiments, the feed outlet openings 218 may be in the shape of a slot. In some embodiments, the feed outlet openings 218 may have various shapes including, but not limited to, oval, polygon or any other shape known to one of ordinary skill in the art. In some embodiments, the feed outlet openings 218 are not present on the distribution tube wall 212. In some embodiments, the feed outlet openings are present on a bottom surface of the feed distribution tube.

When the feed passes through the feed distribution tube 210, the feed exits the feed distribution tube through the feed outlet openings 210 and flows into the body chamber 102 and the filter assembly 130. In some embodiments, the feed outlet openings 218 are defined symmetrically on the feed distribution tube 210 such that the feed exits evenly through the feed outlet openings 218 of the feed distribution tube 210. In some embodiments, an opening provided at the distribution outlet end 216 may be closed or sealed so that axial flow of the feed towards the filter assembly 130 or directing flow of the feed towards a central and a small area of the filter assembly 130 may be restricted and allowed only radial flow of the feed through the feed outlet openings 218.

Figure 11:
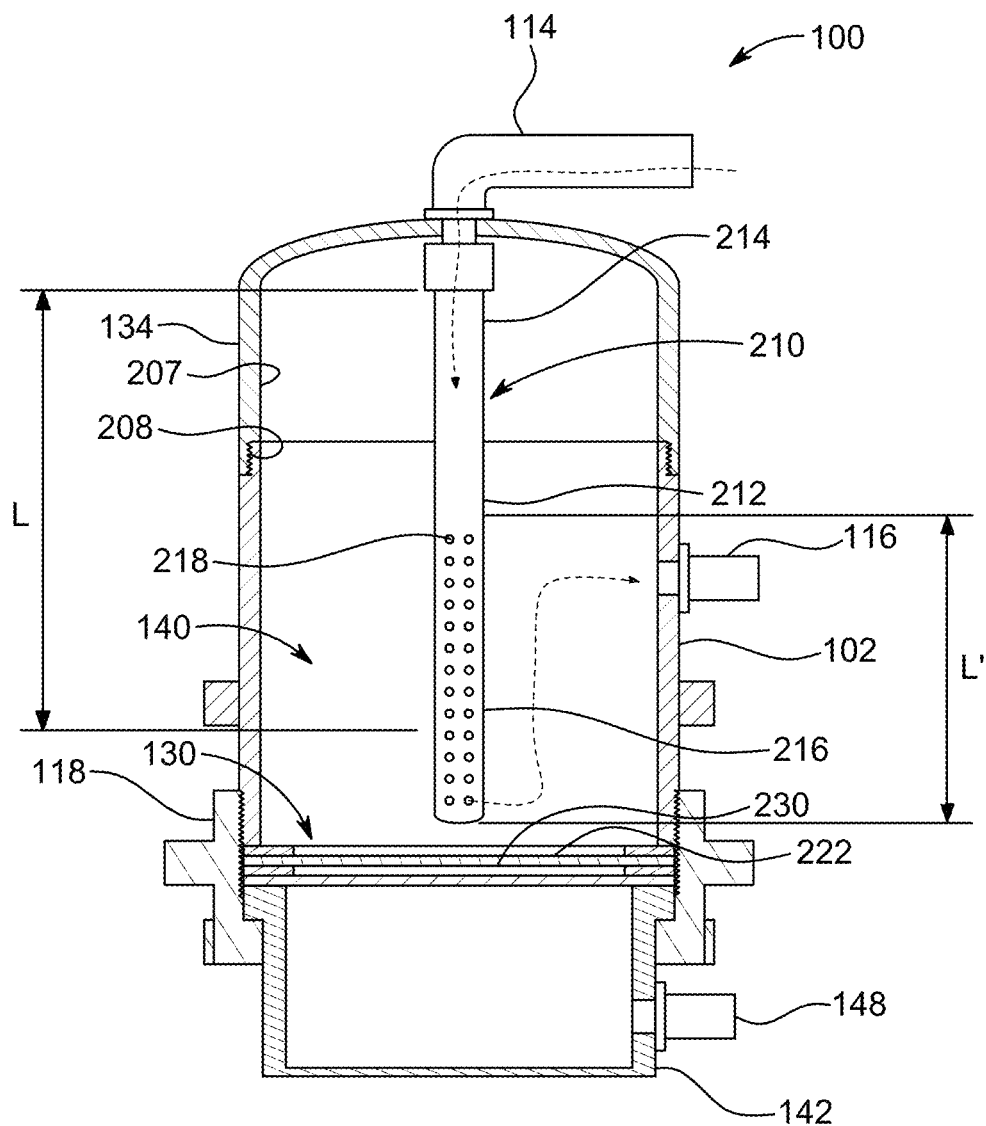
FIG. 11 is a schematic sectional view of the membrane filter apparatus of FIG. 1 showing a flow of feed, according to an embodiment of the present disclosure.

In the assembled configuration of the membrane filter apparatus 100, as also seen in FIG. 11, the feed distribution tube 210 passes through a center of the body chamber 102 in a direction substantially parallel to a length of the body chamber 102. In other words, the feed distribution tube 210 is disposed parallel to the longitudinal axis 'A' of the membrane filter apparatus 100. The feed distribution tube length 'L' of the feed distribution tube 210 is sufficient to cause the feed to enter the body chamber 102 at a feed start point such that a feed distance measured from the filter assembly to the feed start point is less than an entrance distance measured from the feed start point to the feed inlet. In other words, the feed distribution tube has a length sufficient to place the feed start point closer to the filter assembly than the feed inlet, i.e., the feed distance from the filter assembly 130 to the feed start point is no greater than 50% of a total length of the body chamber 102. The phrase 'total length of the body chamber 102' may be defined based on the interior volume 140 of the membrane filter apparatus 100 and equivalent to a height of the interior volume 140 defined by the body chamber 102 and the body cap 134 above the filter assembly 130. The phrase 'feed distance' may be defined as a gap measured along the longitudinal axis 'A' between a surface 222 of the filter assembly 130 and the distribution outlet end 216 of the feed distribution tube 210. As such, the feed distribution tube 210 allows the feed to flow across the filter assembly 130 in a direction substantially parallel to the surface 222 of the filter assembly 130, and thereby obtain an even flow of the feed across the surface 222 of the filter assembly 130. The phrase 'minimum feed distance' may be defined as a gap measured along the longitudinal axis 'A' between a surface 222 of the filter assembly 130 and the nearest distribution outlet opening 218 of the feed distribution tube 210. The phrase 'maximum feed distance' may be defined as a gap measured along the longitudinal axis 'A' between a surface 222 of the filter assembly 130 and the farthest distribution outlet opening 218 (present at the feed start point) of the feed distribution tube 210.

The membrane filter apparatus 100 further comprises the filter assembly 130 located at the filter end 112 of the body chamber 102. Particularly, the filter assembly 130 is located immediately below the filter end 112 of the body chamber 102 and disposed between the body chamber and the filter cap 118 in the assembled configuration of the membrane filter apparatus 100. The filter assembly is configured such that no component present in the feed may pass from the body chamber into the filter cap without passing through the filter assembly. The filter assembly 130 includes a filter 230 located at the filter end 112 of the body chamber 102. The filter 230 is placed at the filter end 112 of the body chamber 102 in such a way that it is oriented substantially perpendicular to the feed distribution tube 210. In other words, the direction of flow of the feed through the feed distribution tube 210 and a plane defined by the surface 222 of the filter 230, otherwise known as the surface 222 of the filter assembly 130, are substantially perpendicular to each other. In general, the filter may be any suitable membrane filter known to one of ordinary skill in the art. In some embodiments, the filter 230 comprises two or more membranes. In some embodiments, the filter 230 comprises an inorganic or mineral membrane. Such an inorganic or mineral membrane may be referred to as a thin-film. In some embodiments, the filter 230 comprises a polymer membrane. In some embodiments, the polymer membrane is mesoporous or microporous. In some embodiments, pore size of the polymer membrane may be defined based on various factors including, but not limited to, type of the liquid mixture and type of the filtration process. In some embodiments, the polymer membrane comprises at least one polymer selected from the group consisting of celluloses, polysulfones, polynitriles, polyamides, polyimides, polyolefins, fluoropolymers, and chloropolymers. Examples of membranes which may be used may be found in U.S. Pat. Nos. 5,753,014A, 4,737,286A, 3,408,315A, 5,035,802A, US20190202747A1, and Warsinger, et. al. [Warsinger, D. M., et. al., A review of polymeric membranes and processes for potable water reuse, Progress in Polymer Science, 2018, 81, 209-237].

The filter assembly 130 further comprises a filter support 232 located below the filter 230 and in contact with a portion of the filter 230. In some embodiments, the filter support 232 contacts an entirety of the filter 230. In alternative embodiments, the filter support 232 contacts a portion of the filter 230. The filter support 232 is configured to provide additional mechanical or structural support to the filter 230. Such mechanical or structural support may be advantageous as pressure of the feed flow may otherwise displace position of the filter 230, deflect the filter 230, or damage the filter 230 during the filtration process. In some embodiments, the filter support 232 comprises a non-flexible support plate. In some embodiments, the non-flexible support plate is located between the filter 230 and the filter cap 118. In some embodiments, the non-flexible support plate is macroporous. In other words, pore size of the filter support 232 is larger than the pore size of the filter 230 such that the filtrate enters the filtrate chamber 142 without significant obstruction after passing through the filter 230. Between the filter 230 and the filter cap 118, the macroporous non-flexible support plate may be placed in order to provide support to the filter 230 during the filtration process while allowing the filtrate pass through the filter 230 to the filtrate chamber 142.

In some embodiments, the filter assembly 130 comprises a filter support gasket 234 located between the filter 230 and the filter support 232. The filter support gasket 234 may additionally seal a connection between the filter 230 and the filter support 232 to prevent leakage of the liquid mixture from the body chamber 102 to the filtrate chamber 142 during the filtration process. In general, the filter support gasket may be any suitable gasket known to one of ordinary skill in the art. The filter support gasket may be any suitable shape and constructed of any suitable material known to one of ordinary skill in the art. In some embodiments, the filter support gasket 234 may be in the form of an annular ring. In such embodiments, the annular right is aligned with a peripheral edge of the filter support 232 and a peripheral edge of the filter 230. In some embodiments, the filter support gasket 234 is made of a flexible material. In alternative embodiments, the filter support gasket 234 is made of a non-flexible material.

In some embodiments, the membrane filter apparatus 100 comprises a filter assembly gasket 238 located between the body chamber 102 and the filter assembly 130. The filter assembly gasket 238 may act as a sealant between the filter assembly 130 and the body chamber 102 to prevent leakage of the liquid mixture from the body chamber 102 to the filtrate chamber 142 during the filtration process. The filter assembly gasket may be any suitable shape and constructed of any suitable material known to one of ordinary skill in the art. In some embodiments, the filter assembly gasket 238 may be in the form of an annular ring. In some embodiments, the annular ring is aligned with a peripheral edge of the filter end 112 of the body chamber 102 and a peripheral edge of the filter 230. In some embodiments, the filter assembly gasket 238 is made of flexible material. In alternative embodiments, the filter assembly gasket 238 is made of a non-flexible material.

Figure 8:
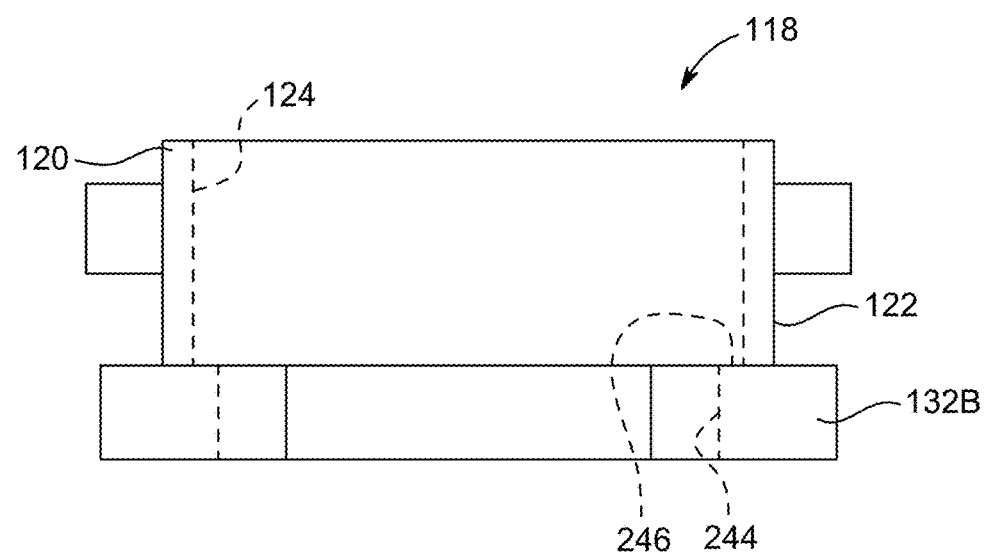
FIG. 8 is a perspective view of a filter chamber, according to an embodiment of the present disclosure.

The membrane filter apparatus 100 comprises the filter cap 118 which is configured to engage with the body chamber 102 and support the filter assembly 130. An image of an exemplary filter cap 118 according to an embodiment of the current invention is provided in FIG. 8. In some embodiments, the interior surface 124 at a top end of the filter cap 118 comprises a threading 242. The filter cap 118 further comprises a shoulder portion 244 at a bottom end thereof. The shoulder portion 244 extend radially inward from the interior surface 124 of the filter cap 118. The shoulder portion 244 has a resting surface 246 defined parallel to the surface 222 of the filter assembly 130. The threading 242 of the filter cap 118 is configured to interface with a threading 248 defined on the exterior surface 106 of the body chamber 102 at the filter end 112 thereof. The threading 242 of the filter cap 118 and the threading 248 of the body chamber 102 are configured to interlock to interface and secure the filter cap 118 to the body chamber 102. As such, the filter cap 118 is threadably engaged with the body chamber 102 in the assembled configuration of the membrane filter apparatus 100. Further, the filter assembly 130 is placed between the filter end 112 of the body chamber 102 and the filter cap 118. The filter cap 118 therefore secures the filter assembly 130 to the filter end 112 of the body chamber 102.

Figure 9:
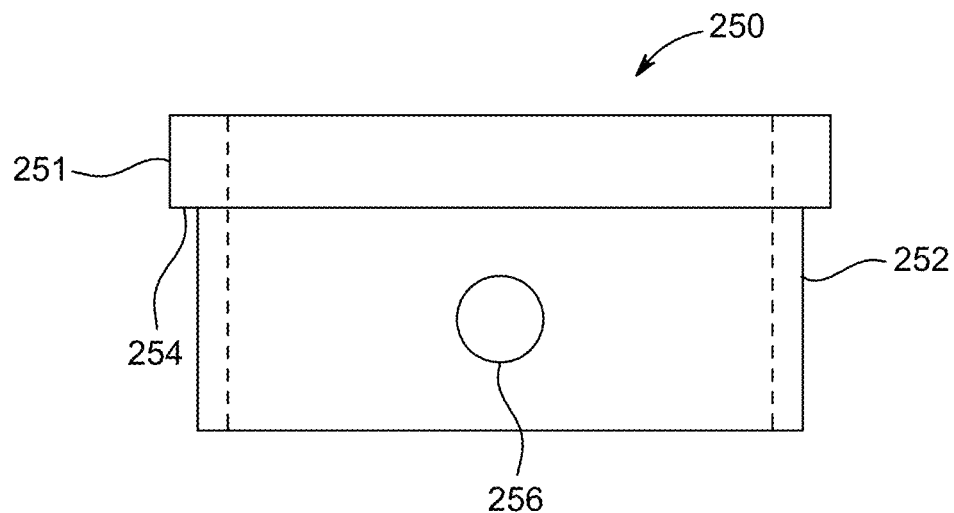
FIG. 9 is a perspective view of a reducer chamber, according to an embodiment of the present disclosure.
Figure 10:
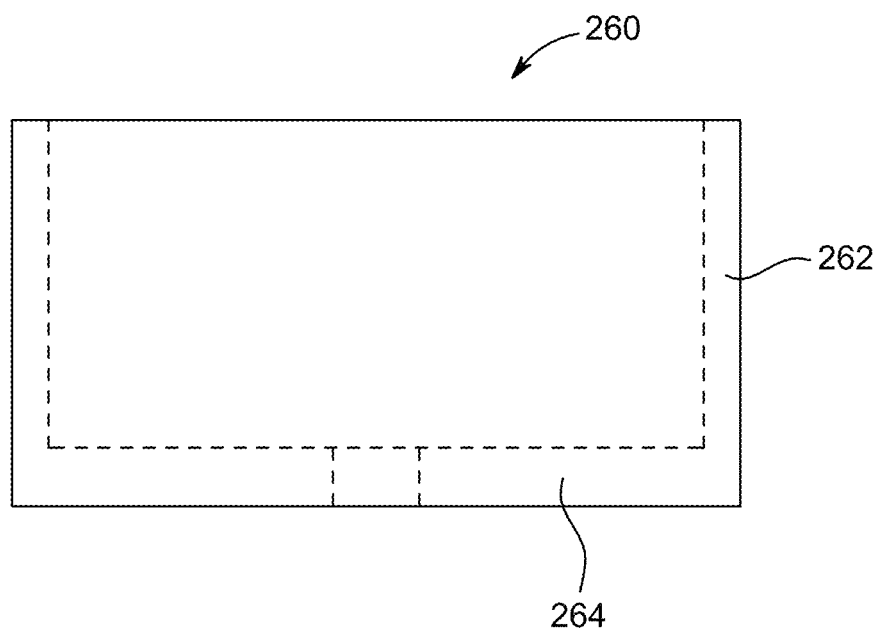
FIG. 10 is a perspective view of a cover member, according to an embodiment of the present disclosure.

In some embodiments, the membrane filter apparatus 100 further comprises a filtrate chamber 142 attached to the filter cap 118. In some embodiments, the filtrate chamber 142 is attached to the filter cap 118 at the location opposite the body chamber 102. In other words, the body chamber 102 is coupled to the top and of the filter cap 118 and extends in an upward direction with respect to the filter cap 118, whereas, the filtrate chamber 142 is coupled to the bottom end of the filter cap 118 and extends in a downward direction with respect to the filter cap 118, opposite to the upward direction of the body chamber 102. In some embodiments, the filtrate chamber 142 comprises a reducer chamber 250. An image of an exemplary reducer chamber 250 according to an embodiment of the current invention is provided in FIG. 9. In some embodiments, the filtrate chamber 142 comprises a cover member 260. An image of an exemplary cover member 260 according to an embodiment of the current invention is provided in FIG. 10. The reducer chamber 250 and/or the cover member 260 may be configured to couple with the filter cap 118 and receive the filtrate therein. In some embodiments, the filtrate chamber 142 may be defined only by the reducer chamber 250. In such embodiments, a top end of the reducer chamber 250 comprises a flange portion 251 extending radially from an exterior surface 252 of a side wall thereof. The side wall of the reducer chamber 250 may be defined as the side wall 144 of the filtrate chamber 142, as seen in FIG. 1. In some embodiments, the flange portion 251 comprises an engaging surface 254 defined parallel to the resting surface 246 of the shoulder portion 244 of the filter cap 118. In such embodiments, during assembly of the membrane filter apparatus 100, the reducer chamber 250 is inserted from top of the filter cap 118 and the resting surface 246 of the filter cap 118 and the engaging surface 254 of the reducer chamber 250 are configured to abut each other. As such, the reducer chamber 250 is supported and held with the filter cap 118. In some embodiments, the side wall of the reducer chamber 250 comprises a through-hole 256 configured to fluidly communicate with one end of the filtrate outlet 148. In some embodiments, an end of the filtrate outlet 148 may be coupled to a container used for receiving the filtrate from the membrane filter apparatus 100. In some embodiments, the reducer chamber 250 may include a bottom wall, which is otherwise defined as the bottom wall 146 of the filtrate chamber 142, as seen in FIG. 1. In such embodiments, the bottom wall of the reducer chamber 250 may include the additional port. The filtrate outlet 148 and the additional port may be selectively opened or closed during the filtration process such as the dialysis process.

In some embodiments, the cover member 260 along with the reducer chamber 250 define the filter cap 118 and receive the filtrate therein. In such embodiments, the cover member 260 is configured to enclose the reducer chamber 250. In some embodiments, the cover member 260 may be a hollow cylindrical body having a side wall 262 and a bottom wall 264. The side wall 262 and the bottom wall 264 are together configured to enclose the reducer chamber 250. In such embodiments, the side wall 262 and the bottom wall 264 may be defined as the side wall 144 and the bottom wall 146, respectively, of the filtrate chamber 142 as seen in FIG. 1. In some embodiments, the reducer chamber 250 is devoid of the bottom wall. In such embodiments, the additional port may be defined in the bottom wall 264 of the cover member 260. The cover member 260 may include an opening 266 defined at the side wall 262 to receive the filtrate conduit 148 therethrough. In some embodiments, the cover member 260 is threadably engaged with the filter cap 118 or the reducer chamber 250. In some embodiments, the cover member 260 may be detachably coupled to the filter cap 118 or the reducer chamber 250 using a snap-fit mechanism, a press-fit mechanism, or any other coupling mechanisms known to one ordinary skill in the art. In some embodiments, while assembling the membrane filter apparatus 100, the cover member 260 encloses the reducer chamber 250 in such a way that the opening 266 defined in the side wall 262 of the cover member 260 is aligned with the through hole 256 defined in the side wall of the reducer chamber 250. As such, the filtrate conduit 148 may be received through the opening 266 of the cover member 260 and fluidly connect with the through hole 256 of the reducer chamber 250. In some embodiments, the cover member 260 includes a grip flange. This grip flange may be attached to or disposed upon an exterior surface of the side wall 262 of the cover member 260. The grip flange may help to hold the cover member 260 during assembly or disassembly of the membrane filter apparatus 100.

FIG. 11 illustrates a schematic sectional view of the membrane filter apparatus 100, according to an embodiment of the present disclosure. The filtration process of the membrane filter apparatus 100 is explained with reference to the FIG. 1 through FIG. 11. It should be understood that the filtration process depicted and described below represent one exemplary embodiment used to illustrate the flow pattern and performance of the membrane filter apparatus 100. The liquid mixture, otherwise referred to as the feed, stored in the liquid mixture source flows through the feed inlet 114 and then through the feed distribution tube 210. The feed distribution tube 210 comprises the feed outlet openings 218 (depicted in the wall 212 thereof). Accordingly, the feed comes out through the feed outlet openings 218 and particularly flow in a direction radially outward from the feed distribution tube 210 to enter the interior volume 140 of the membrane filter apparatus 100. Due to the symmetric orientation of the feed outlet openings 218, a feed liquid flow distribution across the filter assembly 130 is substantially and evenly distributed across the surface 222 of the filter assembly 130. The symmetric orientation of the feed outlet openings 218 helps to evenly distribute the feed liquid flow in the body chamber 102. The feed in the body chamber 102 then flows across the filter 230 in a direction substantially parallel to the surface 222 of the filter assembly 130. This direction is substantially perpendicular to the length of the feed distribution tube 210. The filter 230 splits the feed into the filtrate and the retentate. In an example, the feed may contain bigger particles and smaller particles. While the feed flows through the filter 230, the bigger particles may be filtered and retained behind the filter 230 whereas the smaller particles can easily pass through the filter 230 based on the pore size of the filter 230. The bigger particles may be defined as particles having size greater than pore size of the filter 230. As such, the particles having size greater than the pore size of the filter 230 may be restricted from permeating the filter 230. Further, the liquid mixture having the bigger particles is restricted from flowing through the filter 230 and retained behind the filter 230. Such liquid mixture having the bigger particles is defined as the retentate or concentrate liquid. The smaller particles may be defined as particles having size smaller than the pore size of the filter 230. As such, the particles having size smaller than the pore size of the filter 230 may be allowed to pass therethrough to the filtrate chamber 142. Further, the liquid mixture having the smaller particles permeates the filter 230 and stored in the filtrate chamber 142. Such liquid mixture having the smaller particles is defined as the filtrate. Accordingly, the liquid mixture containing the smaller particles permeates the filter assembly 130 whereas the liquid mixture containing the bigger particles (retentate) flows through the body chamber 102 in a direction (depicted as upward in FIG. 11) substantially antiparallel to the feed liquid flow through the feed distribution tube 210 (depicted as downward in FIG. 11). The phrase 'direction substantially antiparallel' may be defined as the direction of flow of the feed within the body chamber 102 is opposite to the direction of feed flow through the feed distribution tube 210 while planes of directions of the feed flow within the body chamber 102 and feed distribution tube remain parallel. The retentate further flows out through the retentate outlet 116 whereas the filtrate is received through the filtrate outlet 148.

In some embodiments, the membrane filter apparatus 100 may be used for a dead-end filtration process. During the dead-end filtration process, the retentate outlet 116 and the filtrate outlet 148 may be sealed or closed using the valves. The feed inlet 114 of the membrane filter apparatus 100 is provided with a liquid mixture. The liquid mixture passes through the feed distribution tube 210 and comes out through the feed outlet openings 218 thereof. Due to the symmetric orientation of the feed outlet openings 218, the liquid mixture flow is substantially and evenly distributed across the surface 222 of the filter assembly 130. The liquid mixture in the body chamber 102 flows across the filter 230 in the direction substantially parallel to the surface 222 of the filter assembly 130. The filter 230 splits the feed into the filtrate and the retentate. The filtrate containing the smaller particles permeate the filter assembly 130 whereas the retentate containing the bigger particles may flow through the body chamber 102 in the direction substantially antiparallel to the liquid mixture flow through the feed distribution tube 210. As the retentate outlet 116 is sealed, the retentate remains in the body chamber 102 and gets deposited on top of the filter assembly 130. Over a period of use, particles rejected by the filter 230 may accumulate at top of the filter assembly 130. Hence the filter assembly 130 or the filter 230 is replaced or cleaned regularly, which would otherwise cause clogging of filter pores. The filtrate may be taken out through the additional port provided in the filtrate chamber 142 of the membrane filter apparatus 100.

In some embodiments, the membrane filter apparatus 100 may be used for a cross-flow filtration process. During the cross-flow filtration process, the filtrate outlet 148 may be sealed while the retentate outlet 116 is kept open. The feed inlet 114 of the membrane filter apparatus 100 is provided with a liquid mixture. The liquid mixture passes through the feed distribution tube 210 and comes out through the feed outlet openings 218. Due to the symmetric orientation of the feed outlet openings 218, the liquid mixture flow is substantially and evenly distributed across the surface 222 of the filter assembly 130. The liquid mixture in the body chamber 102 flows across the filter 230 in the direction substantially parallel to the surface 222 of the filter assembly 130. The filter 230 splits the feed into the filtrate and the retentate. The filtrate containing the smaller particles permeates the filter assembly 130 whereas the retentate containing the bigger particles flows through the body chamber 102 in the direction substantially antiparallel to the liquid mixture flow through the feed distribution tube 210. The retentate is received through the retentate outlet 116 whereas the filtrate is taken out through the additional port provided in the filtrate chamber 142 of the membrane filter apparatus 100.

In some embodiments, the membrane filter apparatus 100 may be used in a dialysis process. The dialysis process may be hemodialysis process which removes extra fluid such as urine and other unwanted substances from blood. During the dialysis process, the filtrate outlet 148, the retentate outlet 116 and the additional port provided in the filtrate chamber 142 are kept open. The feed inlet 114 of the membrane filter apparatus 100 is provided with a liquid mixture for dialysis process. In some embodiments, the liquid mixture may be blood. The liquid mixture passes through the feed distribution tube 210 and comes out through the feed outlet openings 218. Due to the symmetric orientation of the feed outlet openings 218, the liquid mixture flow is substantially and evenly distributed across the surface 222 of the filter assembly 130. Another fluid, such as a dialysate solution, may be injected through the port of the filtrate chamber 142. The liquid mixture is higher in concentration compared to the dialysate solution. The liquid mixture in the body chamber 102 flows across the filter 230 in the direction substantially parallel to the surface 222 of the filter assembly 130. The substance, or particles, having smaller size may permeate the filter 230 and enter the filtration chamber 142 and mixed with the dialysate solution due to diffusion principle. According to diffusion principle, substances in higher concentration area tend to move to the lower concentration area. Further, a negative pressure may be induced in the filtrate chamber 142 to create a pressure difference in the filtrate chamber 142 and the body chamber 102. Accordingly, the smaller particles from the liquid mixture permeates the filter 230 into the dialysate solution. The liquid mixture that lost the smaller particles, or the retentate, flows through the body chamber 102 in the direction substantially antiparallel to the liquid mixture flow through the feed distribution tube 210 and comes out through the retentate outlet 116. The dialysate solution having the smaller particles received within the filtrate chamber 142 leaves the filtrate chamber 142 through the filtrate outlet 148.

Figure 12:
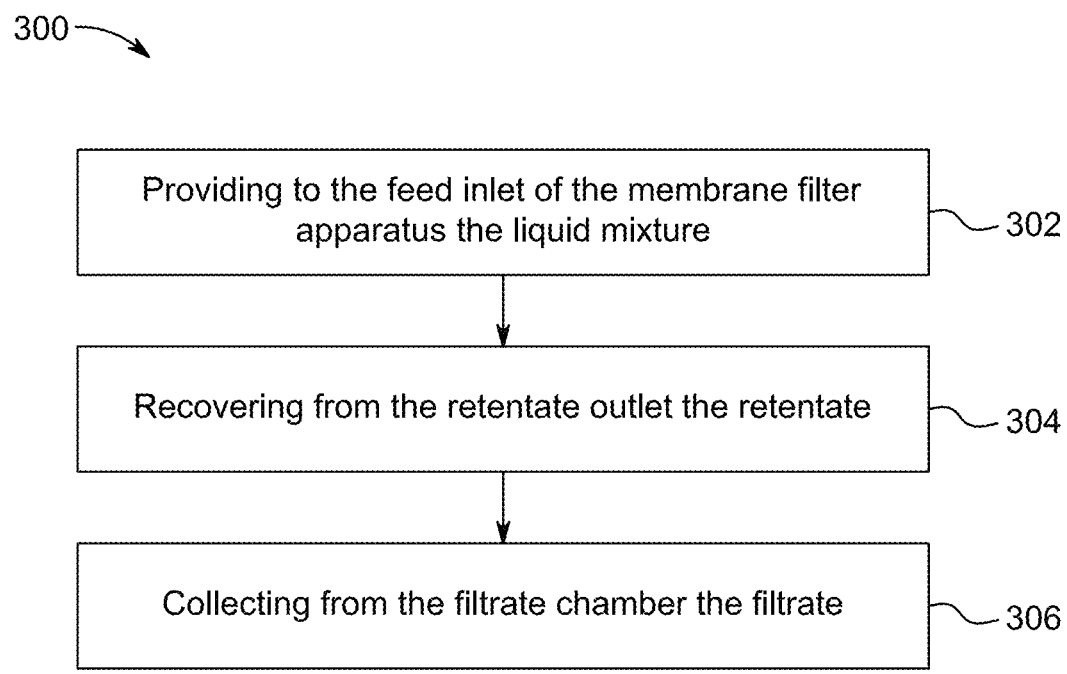
FIG. 12 is a flow diagram of a method of filtering a liquid mixture using the membrane filter apparatus, according to an embodiment of the present disclosure.

The present disclosure also relates to a method of filtering a liquid mixture. Referring to FIG. 12, a method 300 of filtering the liquid mixture is illustrated, according to an embodiment of the present disclosure. The method 300 of filtering the liquid mixture using the membrane filter apparatus 100 is explained with reference to FIG. 1 through FIG. 12. At step 302, the method 300 comprises providing the liquid mixture to the feed inlet 114 of the membrane filter apparatus 100. In some embodiments, the liquid mixture is an aqueous mixture. The first end 202 of the feed inlet 114 is coupled to the body cap 134 of the membrane filter apparatus 100 and the second end 204 is fluidly coupled with the liquid mixture source containing the liquid mixture. In some embodiments, a pump may be used to supply the liquid mixture to the membrane filter apparatus 100 through the feed inlet 114. At step 304, the method 300 comprises recovering the retentate from the retentate outlet 116. The liquid mixture, otherwise referred to as the feed, entered the feed inlet 114 flows through the feed distribution tube 210 and comes out through the feed outlet openings 218. The feed flows in the radial direction to enter the interior volume 140 of the membrane filter apparatus 100. As such, the feed flow distribution across the filter assembly 130 is substantially and evenly distributed across the surface 222 of the filter assembly 130. Further, the feed in the body chamber 102 flows across the filter 230 in the direction substantially parallel to the surface 222 of the filter assembly 130. While the feed flows through the filter 230, the bigger particles of the liquid mixture may be rejected and retained behind the filter 230 whereas the smaller particles of the liquid mixture permeate the filter 230. Accordingly, the liquid mixture containing the bigger particles flows through the body chamber 102 in the direction substantially antiparallel to the feed flow through the feed distribution tube 210. The retentate further flows out through the retentate outlet 116. The retentate may be received through the retentate outlet 116 and further collected in the container coupled with the retentate outlet 116. At step 306, the method 300 comprises collecting the filtrate from the filtrate chamber 142. The liquid mixture containing the smaller particles permeate the filter assembly 130 and collected in the filtrate chamber 142. The filtrate collected in the filtrate chamber 142 flows out through the filtrate outlet 148 and further collected in the container fluidly coupled with the filtrate outlet 148.

The examples below are intended to further illustrate protocols for and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

The invention claimed is:

1. A membrane filter apparatus comprising:
a body chamber comprising an inlet end and a filter end;
a feed inlet disposed on the inlet end of the body chamber;
a feed distribution tube fluidly connected to the feed inlet comprising a distribution inlet end and a distribution outlet end and comprising one or more feed outlet openings through which a feed liquid may pass into the body chamber;
a retentate outlet fluidly connected to the body chamber and located at the inlet end of the body chamber;
a filter assembly comprising:
a filter located at the filter end of the body chamber and oriented substantially perpendicular to the feed distribution tube, and
a filter support in contact with a portion of the filter;
a filter cap which interfaces with the filter end of the body chamber and secures the filter assembly to the filter end of the body chamber, wherein:
the feed distribution tube passes through a center of the body chamber in a direction substantially parallel to a length of the body chamber has a feed distribution tube length sufficient to cause the feed liquid to enter the body chamber at a feed start point such that a feed distance measured from the filter assembly to the feed start point that is less than an entrance distance measured from the feed start point to the feed inlet; and
the membrane filter apparatus is configured such that feed liquid may flow into the feed inlet, through the feed distribution tube, and out through the one or more feed outlet openings such that the feed liquid flows across the filter in a direction substantially parallel to a surface of the filter assembly where the filter is configured to split the feed liquid into a filtrate and a retentate, the filtrate passing through the filter assembly and the retentate flowing through the body chamber in a direction substantially antiparallel to the feed liquid through the feed distribution tube and out through the retentate outlet.

2. The membrane filter apparatus of claim 1, wherein the body chamber is substantially cylindrical in shape.

3. The membrane filter apparatus of claim 2, wherein the feed liquid flows through the one or more feed outlet openings such that a feed liquid flow distribution across the filter assembly is substantially evenly distributed across the surface of the filter assembly.

4. The membrane filter apparatus of claim 1, further comprising a filtrate chamber attached to the filter cap at a location opposite the body chamber.

5. The membrane filter apparatus of claim 4, further comprising a filtrate outlet fluidly connected to the filtrate chamber.

6. The membrane filter apparatus of claim 1, wherein the filter end of the body chamber and the filter cap further comprise threading, the threading configured to interlock to interface and secure the filter cap to the body chamber.

7. The membrane filter apparatus of claim 6, wherein the body chamber and the filter cap further comprise a grip flange attached to or disposed upon an exterior surface of the filter cap or body chamber.

8. The membrane filter apparatus of claim 7, wherein the grip flange has a substantially hexagonal shape.

9. The membrane filter apparatus of claim 1, wherein the filter support comprises a non-flexible support plate located between the filter and the filter cap.

10. The membrane filter apparatus of claim 9, wherein the non-flexible support plate is macroporous.

11. The membrane filter apparatus of claim 9, wherein the filter assembly further comprises a filter support gasket located between the filter and the non-flexible support plate.

12. The membrane filter apparatus of claim 1, further comprising a body cap attached to or disposed upon the inlet end of the body chamber.

13. The membrane filter apparatus of claim 12, wherein the body cap and the inlet end of the body chamber comprise threading, the threading configured to interlock to interface and secure the body cap to the body chamber.

14. The membrane filter apparatus of claim 1, wherein the filter comprises a polymer membrane.

15. The membrane filter apparatus of claim 14, wherein the polymer membrane is mesoporous or microporous.

16. The membrane filter apparatus of claim 14, wherein the polymer membrane comprises at least one polymer selected from the group consisting of celluloses, polysulfones, polynitriles, polyamides, polyimides, polyolefins, fluoropolymers, and chloropolymers.

17. A method of filtering a liquid mixture, the method comprising:
providing to the feed inlet of the membrane filter apparatus of claim 1 the liquid mixture;
recovering from the retentate outlet a retentate; and
collecting from the filtrate assembly a filtrate.

18. The method of claim 17, wherein the liquid mixture is an aqueous mixture.

* * * * *